(12) United States Patent
Cheng

(10) Patent No.: US 9,363,957 B2
(45) Date of Patent: Jun. 14, 2016

(54) HYDROPONIC VEGETABLE CULTURE DEVICE

(71) Applicant: Sheng-Hsiung Cheng, New Taipei (TW)

(72) Inventor: Sheng-Hsiung Cheng, New Taipei (TW)

( * ) Notice: Subject to any disclaimer, the term of this patent is extended or adjusted under 35 U.S.C. 154(b) by 78 days.

(21) Appl. No.: 14/340,527

(22) Filed: Jul. 24, 2014

(65) Prior Publication Data

US 2016/0021838 A1 Jan. 28, 2016

(51) Int. Cl.
*A01G 31/02* (2006.01)

(52) U.S. Cl.
CPC .................................... *A01G 31/02* (2013.01)

(58) Field of Classification Search
CPC ... A01G 31/02; A01G 31/0245; A01G 31/04; A01G 31/003
USPC ................. 47/59 R, 62 R, 62 C, 63
See application file for complete search history.

(56) References Cited

U.S. PATENT DOCUMENTS

| | | | | |
|---|---|---|---|---|
| 3,868,787 A | * | 3/1975 | Wong, Jr. ............... | A01G 31/02 47/41.13 |
| 4,379,375 A | * | 4/1983 | Eisenberg ............... | A01G 31/02 47/65 |
| 4,486,977 A | * | 12/1984 | Edgecombe ........... | A01G 31/02 47/59 R |
| 4,860,490 A | * | 8/1989 | Morris ................... | A01G 31/02 47/59 R |
| 4,879,841 A | * | 11/1989 | Sjostrand ............... | A01G 31/04 198/724 |
| 4,932,158 A | * | 6/1990 | Roberts ................. | A01G 31/047 47/64 |
| 5,097,627 A | * | 3/1992 | Roberts ................. | A01G 31/045 47/62 R |

FOREIGN PATENT DOCUMENTS

| | | | | |
|---|---|---|---|---|
| JP | 04200328 A | * | 7/1992 | |
| NL | 9100112 A | * | 8/1992 | ............. A01G 31/02 |

* cited by examiner

*Primary Examiner* — Monica Williams
*Assistant Examiner* — Danielle Clerkley
(74) *Attorney, Agent, or Firm* — Leong C. Lei

(57) ABSTRACT

A hydroponic vegetable culture device generally includes a plurality of side-by-side arranged tanks and a plurality of slide boards set on the tanks. The slide boards extend across and straddle the tanks and are movable along the tanks. The slide boards are each provided with retainer frames that respectively correspond to the tanks and each includes an absorbent piece attached thereto. The tanks receive therein a nutrient solution. The absorbent pieces of the retainer frames receive vegetable seeds to be deposited therein. The absorbent pieces are allowed to absorb and keep therein the nutrient solution so as to achieve culture of hydroponically cultured vegetables. The slide boards are sequentially moved rearward so that when the slide boards reach an end of the tanks, the hydroponically cultured vegetables growing therein can be harvested. Thus, the culture of hydroponically cultured vegetables is made easy and efficient.

4 Claims, 8 Drawing Sheets

HYDROPONIC VEGETABLE CULTURE DEVICE

(a) TECHNICAL FIELD OF THE INVENTION

The present invention generally relates to a hydroponic vegetable culture device, and more particularly to a hydroponic vegetable culture device that makes hydroponic cultures of vegetables easy and efficient.

(b) DESCRIPTION OF THE PRIOR ART

A regular way of hydroponic culture of vegetables is to deposit seeds in culture facility to allow the hydroponic vegetables to absorb nutrient solution to grow up. However, during the growth of the vegetables of the conventional ways of hydroponics, the vegetables must be transplanted according to the dates of cultivation (such as being planted in a first zone from day 1 to day 3, transplanted to a second zone from day 4 to day 6, transplanted to a third zone from day 7 to day 9, and so on) in order to record the dates of growth, whereby the hydroponic vegetable can be harvested at the time when they get a best mature condition. Such a conventional way of culture is troublesome and labor consuming and requires precisely recording the transplantation date when transplantation is made, otherwise the result of cultivation will be affected. In view of these problems, the present invention aims to provide an improved hydroponic vegetable culture device, which makes the hydroponic culture of vegetables easy and efficient.

SUMMARY OF THE INVENTION

The primary object of the present invention is to provide a hydroponic vegetable culture device that requires no transplantation according to the cultivation date of the hydroponically cultured vegetables so as to make the hydroponic culture of vegetables easy and efficient.

The hydroponic vegetable culture device generally comprises a plurality of side-by-side arranged tanks and a plurality of slide boards set on the tanks. The slide boards extend across and straddle the tanks and are movable along the tanks. The slide boards are each provided with retainer frames that respectively correspond to the tanks and each comprises an absorbent piece attached thereto. The tanks receive therein a nutrient solution. The absorbent pieces of the retainer frames receive vegetable seeds to be deposited therein. The absorbent pieces are allowed to absorb and keep therein the nutrient solution so as to achieve culture of hydroponically cultured vegetables. The slide boards are sequentially moved rearward so that when the slide boards reach an end of the tanks, the hydroponically cultured vegetables growing therein can be harvested. Thus, the culture of hydroponically cultured vegetables is made easy and efficient.

In the above discussed hydroponic vegetable culture device, the tanks each comprise flanges formed on outer sides of top edges thereof. The slide boards each comprise hooks formed on end edges thereof by being curved downward. The slide boards are positioned by having the hooks engage the flange so as to be slidable along the tanks.

In the above discussed hydroponic vegetable culture device, the slide boards each comprise a plurality of fitting sections that is arranged to space from each other and is each in the form of a notch. The retainer frames each comprise a horizontal U-shape clip section, so that the retainer frame is positionable by fitting the clip section over the corresponding fitting section of the slide board.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
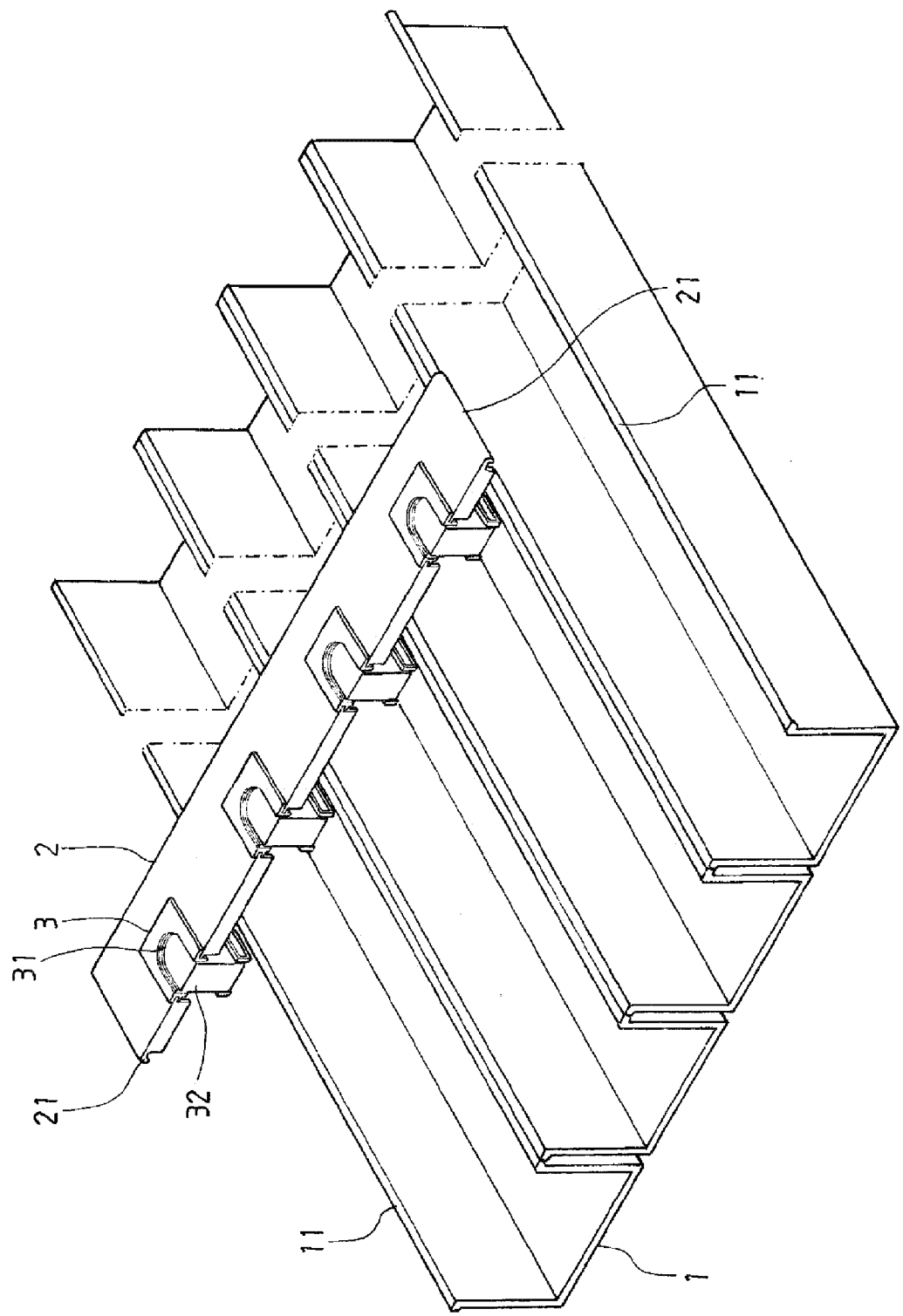
FIG. 1 is an exploded view showing the present invention.
Figure 2:
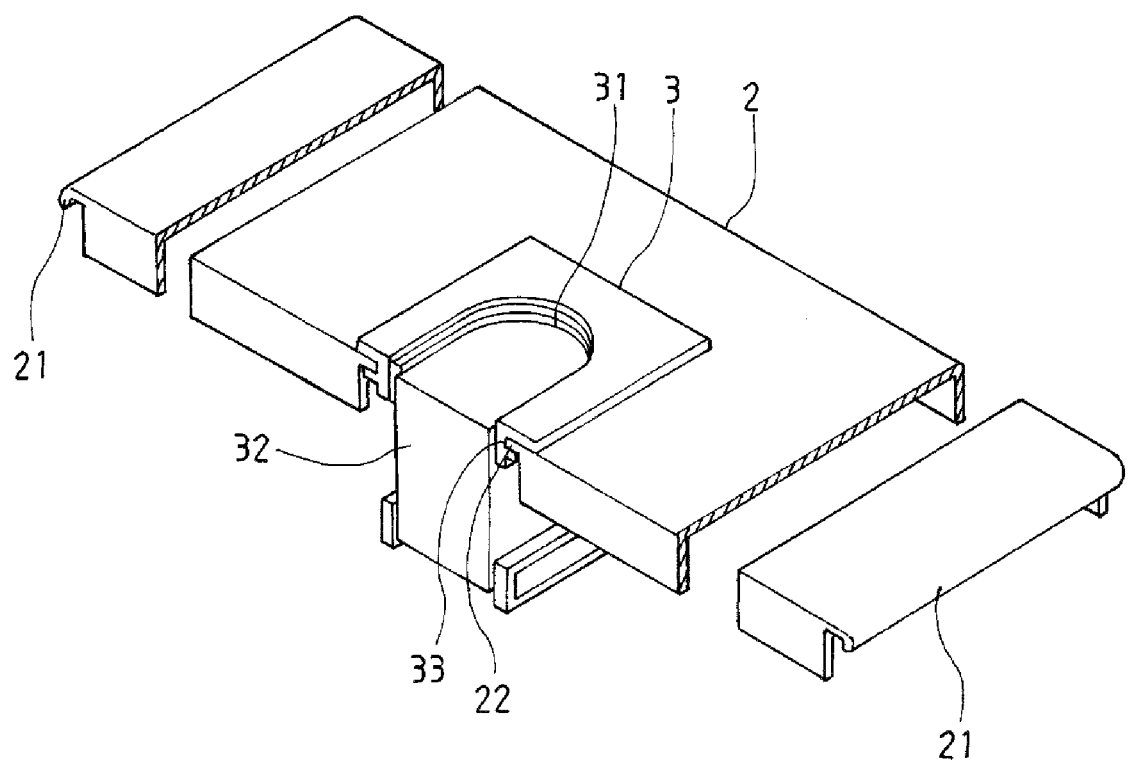
FIG. 2 is a perspective view showing a slide board and retainer frames of the present invention.
Figure 3:
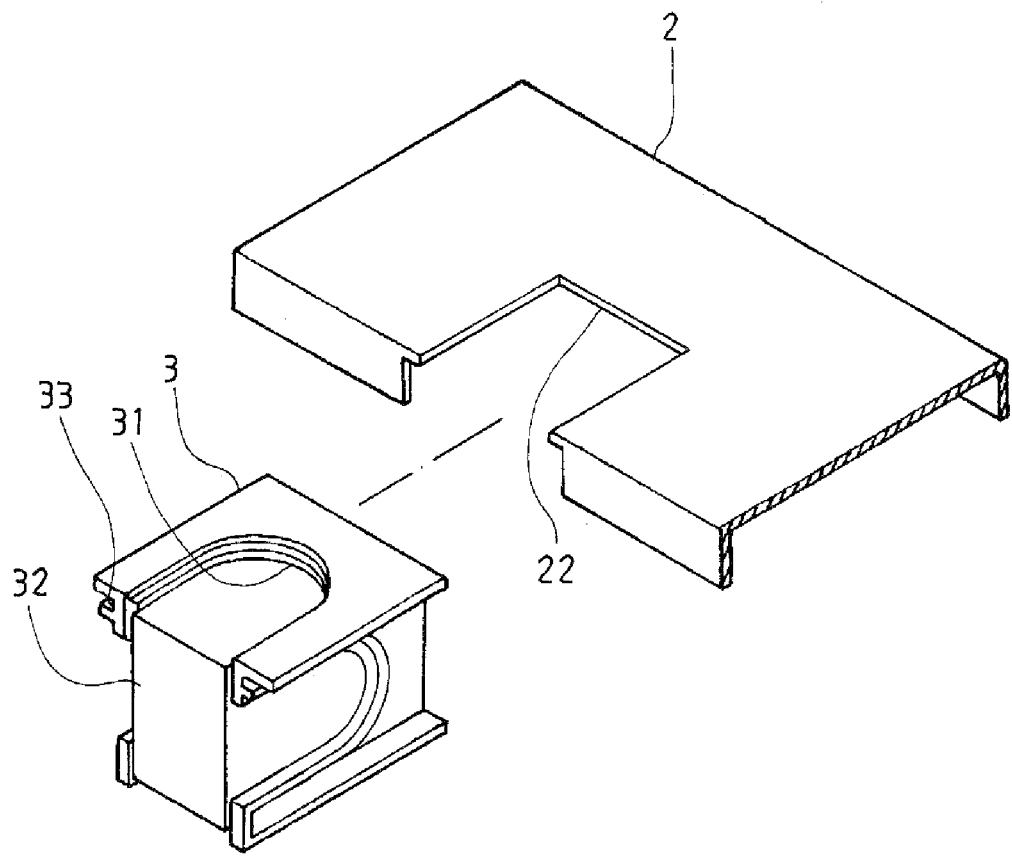
FIG. 3 is an exploded view of the slide board and the retainer frames of the present invention.

Referring simultaneously to FIGS. 1, 2, and 3, which are respectively an exploded view of the present invention and a perspective view and an exploded view of a slide board and retainer frames of the present invention, as shown in the drawings, the present invention comprises a plurality of tanks 1, which is arranged side by side, a plurality of slide boards 2 arranged in the tanks 1, and a plurality of retainer frames 3 mounted to the slide boards 2. The tanks 1 each comprise curved flanges 11 on the outer sides of top edges thereof.

The slide boards 2 are each arranged to extend across and straddle the tanks 1 and each has end edges that are curved downward to each form a curved hook 21, whereby the slide board 2 may be set on the tanks 1 by having the hooks 21 in hooking engagement with the flanges 11 and, with the flanges 11 as supports, the slide board 2 is slidable along the tanks 1. The slide boards 2 are each provided with a plurality of fitting sections 22 that is arranged to space from each other and is each in the form of a notch in such a way that the fitting sections 22 correspond in position to the tanks 1.

The retainer frames 3 each comprise a frame-like receiving sections 31, which receives and retains an absorbent piece 32 therein in such a way that the absorbent piece 32 extends therefrom downward by a predetermined distance. In the instant embodiment, the absorbent piece 32 comprises a material of for example sponge or one that absorbs and holds therein liquids. The retainer frame 3 has an upper rim that forms a horizontal U-shaped clip section 33, whereby the retainer frame 3 is positionable by fitting the clip section 33 over the corresponding fitting section 22 of the slide board 2 so as to mount the plurality of retainer frames 3 to the slide board 2.

With an assembly made up of the above components a device for culture of hydroponically cultured vegetables is provided. A nutrient solution is deposited and contained in each of the tanks 1 and the absorbent piece 32 of each of the retainer frames 2 is provided with vegetable seeds positioned therein, whereby the absorbent pieces 32 absorbs and conducts the nutrient solution to achieve culture of the hydroponically cultured vegetables. Further, the slide boards 2 may be moved forward along the tanks 1 according to the dates of culture thereof, whereby when the slide boards 2 are moved to the very ends of the tanks 1, the hydroponically cultured vegetables that are growing can be harvested. No transplantation is required during the process of cultivation of the hydroponically cultured vegetables so that the culture of hydroponically cultured vegetables is made easy and efficient.

Figure 4:
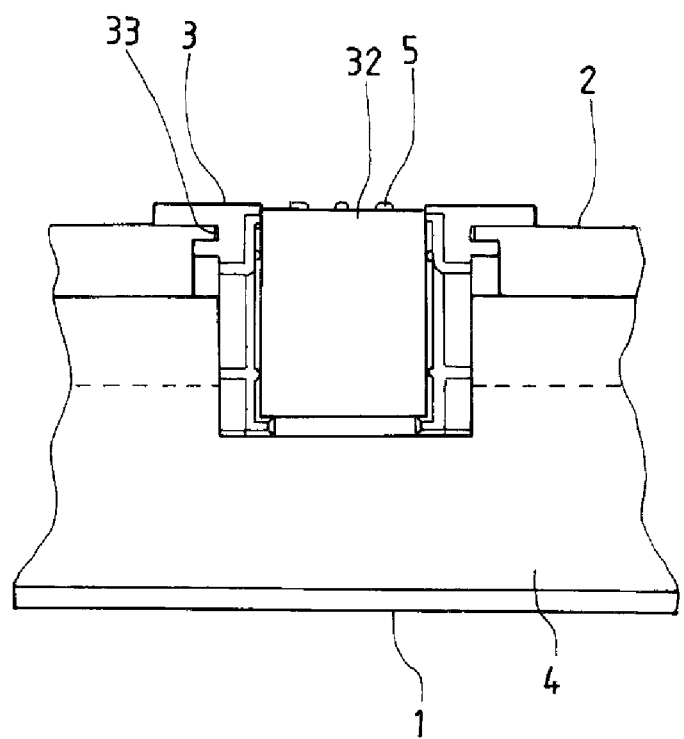
FIGS. 4 and 5 are schematic views illustrating an application of the present invention.
Figure 5:
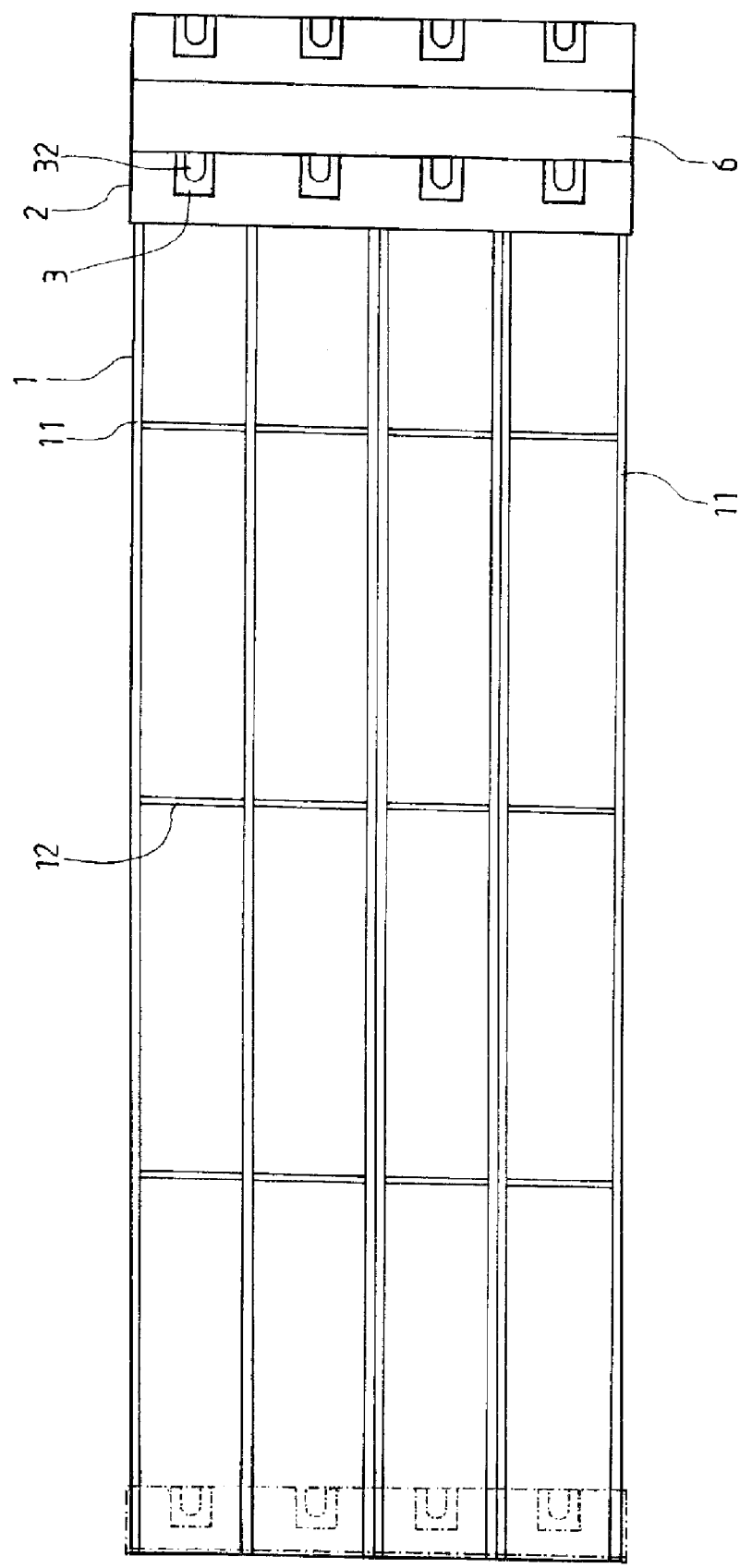

Referring to FIGS. 4 and 5, schematic views are given to illustrate an application of the present invention. Reference being also had to FIG. 1, as shown in the drawings, in an application of the present invention, separator plates 12 are arranged within the side-by-side arranged tanks 1 and spaced from each other by a predetermined distance to define various zones. The zones are supplied with a nutrient solution 4. Vegetable seeds 5 are deposited in the absorbent piece 32 of each of the retainer frame 2. The slide board 2 is set to extend across and straddle the tanks 1 with the hooks 21 of the slide board 2 in engagement with the flanges 11 of the tanks 1 to achieve positioning so that the absorbent pieces 32 of the retainer frames 2 are allowed absorb the nutrient solution 4 to supply nutrition to the vegetable seeds 5, allowing the vegetable seeds 5 to grow up day by day as hydroponically cultured vegetables. In the instant embodiment, after a first slide board 2 is set on the tanks 1 for several days, a second, next slide board 2 is then set on the tanks 1 (for example, three days after the setting of the first slide board 2) and a spacer board 6 having a predetermined width is preferably positioned between the first slide board 2 and the next, second slide board 2 to provide a space for growth of the hydroponically cultured vegetables. The spacer board 6 is sized according to the size of the hydroponically cultured vegetables cultured. As such, different slide boards 2 are set at different dates and then the slide boards 2 that are set earlier would be forced to sequentially move toward the rear end of the tanks 1. In other words, the culture date will be increased gradually. When the first slide board 2 is moved to the end of the tanks 1, a robotic arm may be used to pick up and turn the retainer frames 3 up-side down to remove the mature hydroponically cultured vegetables. This makes the culture of the hydroponically cultured vegetables easier and more efficient.

During a culture process carried out with the present invention, the hydroponically cultured vegetables that are planted at different dates are arranged to move sequentially along the tanks 1, whereby after certain time of cultivation, the first planted hydroponically cultured vegetables can be harvested at the end of the tanks 1. This is convenient and there is no need for repeated transplantations of the hydroponically cultured vegetables according to the date of plantation. Labor can be saved and culture is made more efficient.

Figure 6C:
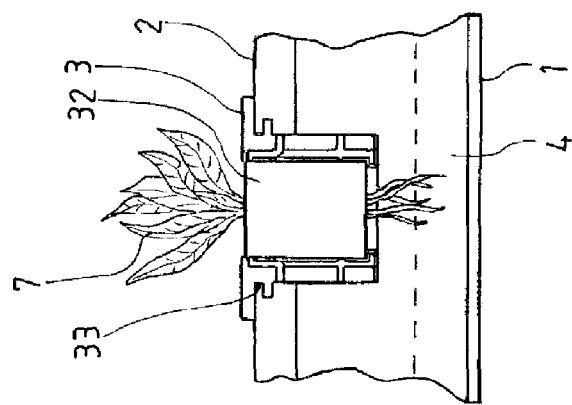
FIGS. 6A, 6B, and 6C are schematic views illustrating a condition of cultivation of the present invention.
Figure 6B:
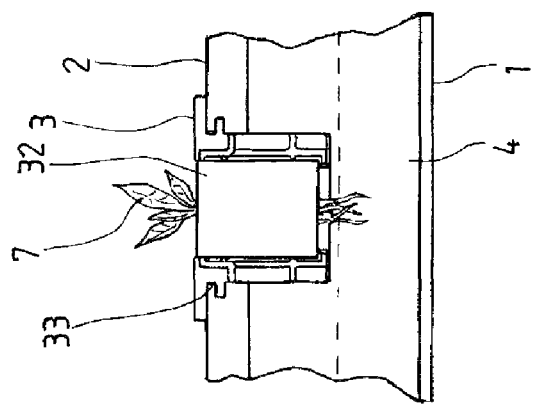
Figure 6A:
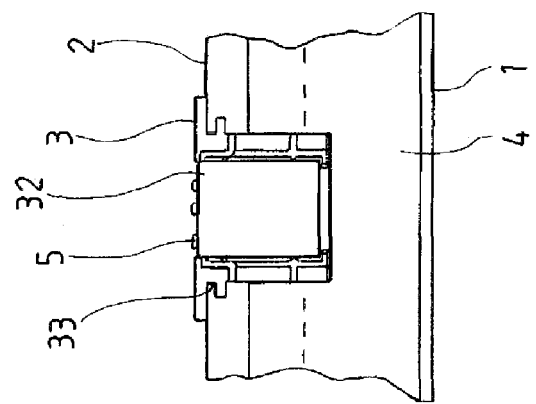

Referring simultaneously to FIGS. 6A, 6B, and 6C, conditions of culture according to the present invention are illustrated. In accordance with the present invention, separator plates 12 may be used to separate different zones, in which different levels of the nutrient solution 4 are deposited. When the vegetable seeds 5 grow up as hydroponically cultured vegetables 7, the roots of the vegetable extend downward so that the levels of the nutrient solution 4 associated with the grown vegetables may be set lower.

Figure 7:
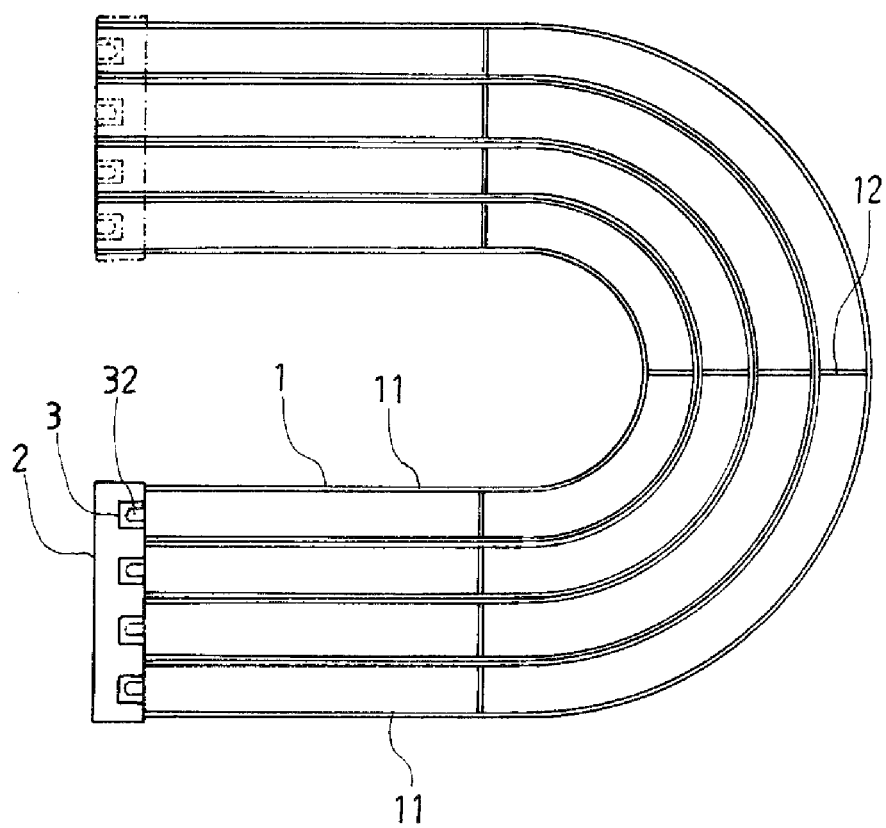
FIG. 7 is a schematic view illustrating another application of the present invention.

Referring to FIG. 7, a schematic view is given to illustrate another application of the present invention. Additional reference being had to FIGS. 1 and 4, as shown in the drawings, besides an arrangement where the tanks 1 are made straight as shown previously, a plurality of tanks 1 may set in a curved form and a nutrient solution 4 is similarly deposited in the tanks 1. Vegetable seeds 5 are deposited in an absorbent piece 32 of each of a plurality of retainer frames 3 mounted to a plurality of slide boards 2. The slide boards are set to extend across and straddle the tanks 1 in such a way that hooks 2 of the slide boards 2 are in hooking engagement with flanges 11 of the tanks 1 for positioning in such a way that the absorbent pieces 32 the retainer frames 2 are allowed to absorb the nutrient solution 4 to supply nutrition to the vegetable seeds 5, whereby the vegetable seeds 5 grow day by day as hydroponically cultured vegetables. In the instant embodiment, the slide boards 2 move along the tanks 1 in a curved path to reach the end of the tanks 1, where a robotic arm is used to pick up and turn the retainer frames 3 up-side down to remove the mature hydroponically cultured vegetables. The setting of the slide boards 2 and the harvesting of the vegetables of the slide board 2 can be carried out at the same side so that culture of hydroponically cultured vegetables is made even more efficient.

Figure 8:
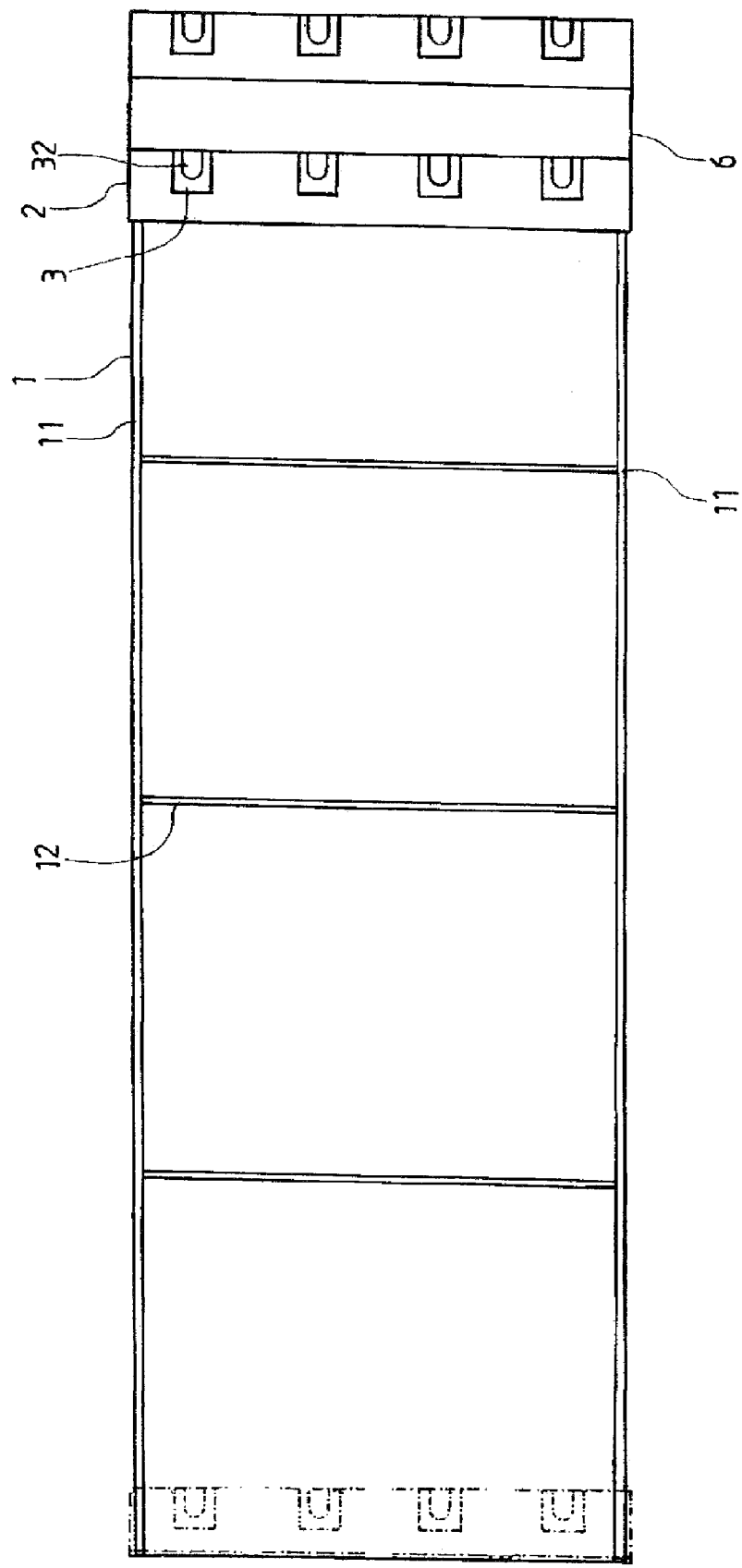
FIG. 8 is a schematic view illustrating a further application of the present invention.

Referring to FIG. 8, a schematic view is given to illustrate a further application of the present invention. As shown in the drawing, besides what were shown previously, the present invention may be embodied by provide a tank 1 that is a tank 1 of a large size sufficient to receive multiple retainers therein. A nutrient solution is deposited in the tank 1 and absorbent pieces 32 of a plurality of retainer frames 3 are each provided with vegetable seeds deposited therein. The absorbent pieces 32 are allowed to absorb the nutrient solution to achieve cultivation of hydroponically cultured vegetables. Slide boards 2 that carry the retainer frames are move sequentially rearward along the tank 1 according to the date of culture. When the slide boards 2 reach the end of the tanks 1, the hydroponically cultured vegetables grow therein can be harvested.

In summary, the present invention provides tanks in which a nutrient solution is deposited, to be used in combination with slide boards that extend across and straddle the tanks and carry absorbent pieces, to constitute a culture device of hydroponically cultured vegetables. The slide boards are sequentially moved rearward along the tanks 1 according to the culture date of the hydroponically cultured vegetables thereof, whereby when the slide boards reach the end of the tanks, the hydroponically cultured vegetables growing therein can be harvested and there is no need for transplantation of the hydroponically cultured vegetables. Thus, the present invention allows vegetables to be hydroponically cultured without transplantation so that the culture of hydroponically cultured vegetables is made easy and efficient.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A hydroponic vegetable culture device, comprising:

a plurality of tanks arranged side by side in a first direction and receiving a nutrient solution deposited therein, the tanks being arranged to each extend in a second direction that is different from the first direction and having a length in the second direction that has a front end and a rear end and a width in the first direction;

a plurality of slide boards extending, in the first direction, across and straddling the tanks and movable along the tanks in the second direction from the front end to the rear end of the tanks, the slide boards having a dimension in the second direction such that the plurality of slide boards is movably positioned on the tanks and spaced from each other by a predetermined interval between the slide boards, each of the slide boards having a horizontal surface that is defined between two opposite edges of the slide board spaced from each other in the second direction and extends flat across the tanks in the first direction, wherein the horizontal surface comprises a plurality of notches spaced from each other along a first edge of the two opposite edges and each of the notches has a side opening defined in the first edge and a receiving space defined in the horizontal surface of the slide board and in communication with the side opening, the receiving space being delimited between two opposite side walls that define therebetween the side opening at the first edge of the side board; and a plurality of retainer frames mounted to the slide boards by being respectively received, through the side openings of the notches, into the receiving spaces of the notches and each of the retainer frames comprising an absorbent piece attached thereto, the absorbent piece being adapted to receive vegetable seeds deposited therein, wherein the absorbent pieces are partly located in the nutrient solution deposited in the tanks to absorb the nutrient solution to achieve cultivation of hydroponically cultured vegetables and the slide boards are sequentially movable rearward according to a culture date of the vegetables cultured therein so that when the slide boards are moved from the front end to the rear end of the tanks, the seeds grow into mature vegetables to be harvested at the rear end of the tanks;

wherein each of the retainer frames has two opposite sides respectively corresponding to the two opposite sides walls of the receiving space of each of the notches into which the retainer frame is received, each of the two opposite sides of the retainer frame comprising a horizontal U-shape clip section that receives the corresponding side wall of the notch therein, so that the retainer frame is positionable in the receiving space of the notch by having the clip sections thereof fit over and slide along the two opposite side walls of the corresponding notch of the slide board.

2. The hydroponic vegetable culture device according to claim 1, wherein the tanks each comprise flanges formed on and projecting sideways from outer sides of top edges thereof, the slide boards each comprising hooks formed on end edges thereof by being curved downward, the slide boards being positioned by having the hooks engage the flanges so as to be slidable along the tanks.

3. The hydroponic vegetable culture device according to claim 1, wherein the retainer frames each comprise a receiving section for receiving and retaining the absorbent piece.

4. The hydroponic vegetable culture device according to claim 1, wherein the absorbent piece comprises sponge.

* * * * *